Patented June 14, 1932

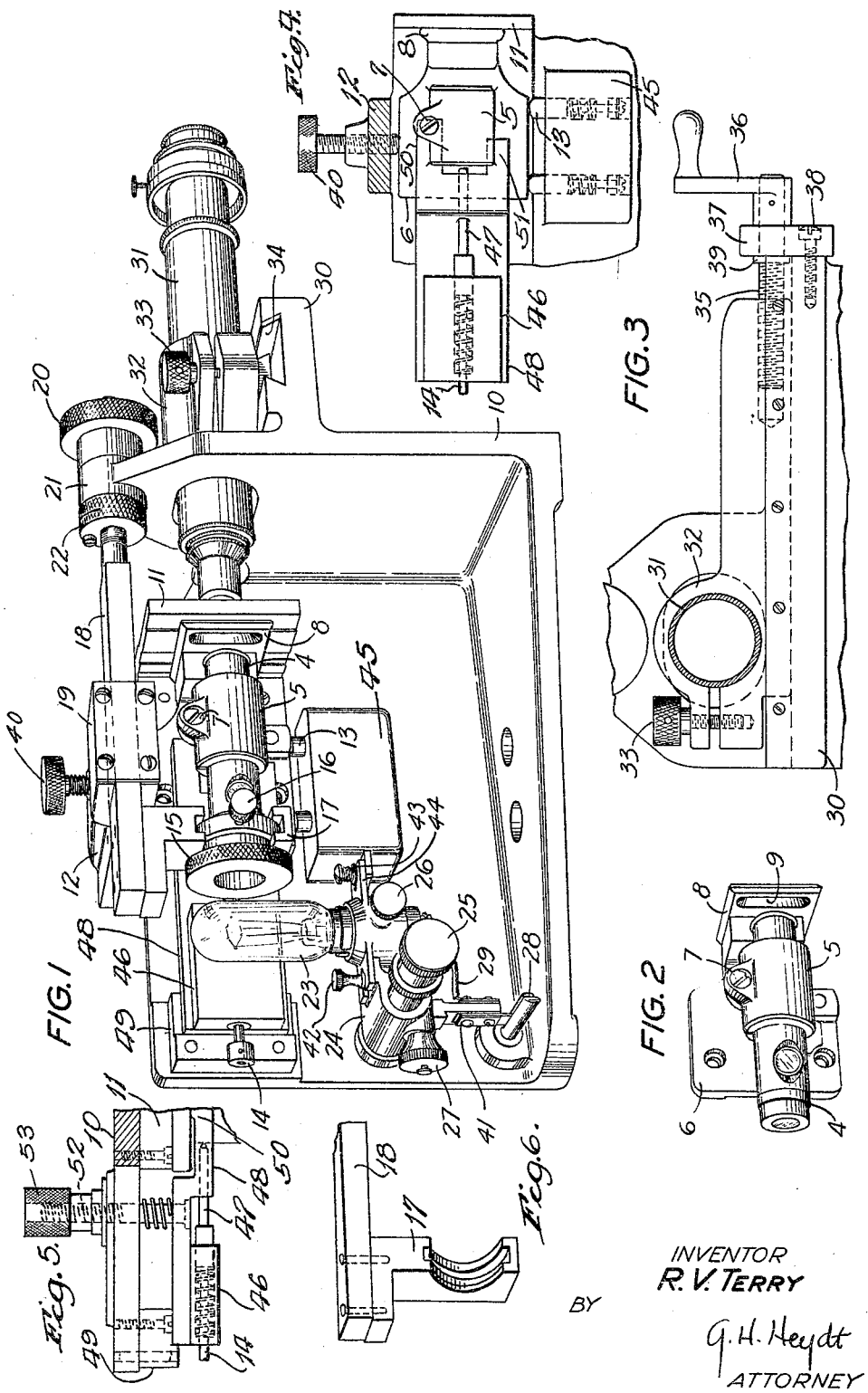

1,863,384

UNITED STATES PATENT OFFICE

ROY V. TERRY, OF MONTCLAIR, NEW JERSEY, ASSIGNOR TO BELL TELEPHONE LABORATORIES, INCORPORATED, OF NEW YORK, N. Y., A CORPORATION OF NEW YORK

LENS TUBE ADJUSTING APPLIANCE

Application filed August 27, 1929. Serial No. 388,673.

This invention relates to sound piceure systems and more particularly to a method of insuring the proper illumination of the sound record.

The object of this invention is a method of adjusting the optical system of a sound reproducing unit while removed from the sound reproducing unit.

A feature of this invention is a device adapted to support the optical system of the sound reproducing unit and to simulate the conditions found in the sound reproducing unit.

Another feature is the provision of means for adjusting the optical system to secure proper alignment and focus of the optical system.

A further feature is the provision of means for observing and measuring the illumination projected by the optical system to a plane simulating the surface of the film sound record.

In the reproduction of sound from a photographic record, it is essential that the illumination of the sound track be restricted to an area not wider than the sound track, of small and definite height, and having its longer side accurately parallel to the striations of the sound track. One method of attaining this illumination, is, by a suitable optical system, to focus the light from a suitable source onto an opaque plate in contact with or very close to the sound track. The plate is pierced by an aperture which may be a small physical slit, a wedge of transparent material, or similar means for passing a beam of known size and location through the plate to the film. Another method is, by a system of lenses, to focus the light from a suitable source onto a slit in an opaque plate not in contact with the film, and then by means of another system of lenses, the image of this slit is focussed on the sound track. For convenience, the two systems of lenses and the slit plate are assembled into a unitary structure, usually having a fixed focus. Such a system may be termed an optical slit, as the physical slit is not in contact with the film; and the assembled structure is called a lens tube.

To secure an accurate reproduction of the sound, the film must present a smooth flat surface to the light beam. A common method of securing this result is to press the film firmly yet yieldingly against an opaque plate, containing an aperture which may be the physical slit, or in the second method outlined above an aperture somewhat larger than the image of the slit. In either case, the optical system used must be definitely located with its axis normal to this film surface. To insure this definite location the aperture plate usually has an extension at right angles to the plate, by which the optical system is supported.

This invention provides means by which the aperture plate is firmly held while such portion of the optical system necessary for focussing is moved with respect to the aperture plate. The image formed in the plane of the device which simulates the film surface may be measured by optical means.

In the preferred embodiment of this invention, the aperture plate is firmly held against an angle plate, mounted on a suitable base and having an opening registering with the aperture in the aperture plate. A suitable ring is clamped on the movable portion of the optical system and is engaged by a yoke by which the movable portion may be slowly advanced to or retracted from the plane simulating the film surface of the sound aperture plate. A source of light projects rays through the optical system to form an image near the plane simulating the film surface. A suitable microscope having its optical axis parallel to the optical axis of the optical system is mounted on the base and focussed on the plane simulating the film surface. The width of the image is measured by projecting an enlarged image from the microscope on a ruled surface or by cross hairs mounted in the microscope and the optical system adjusted until the image is of the desired width. Means are provided to traverse the microscope normal to the axis of the optical system so that the image may be measured throughout its length. If necessary, the optical system is rotated until the image is parallel to the plane in which the miscroscope is traversed. When the adjustment is completed, the optical system may be clamped to the aperture plate and the assembly removed and mounted in the projector.

Referring to the drawing

Fig. 1 is an elevation of the adjusting device with the lens tube in position;

Fig. 2 is an elevation of the lens tube and supporting clamp;

Fig. 3 is a detail view showing the gear for traversing the microscope;

Fig. 4 is a plan view in part section of a retaining clamp;

Fig. 5 is a top view in part section of the clamp shown in Fig. 4; and

Fig. 6 is a detail view of the yoke and actuating rod.

In Fig. 2, a lens tube 4 comprising a condensing lens, slit, and projecting lens is supported in a clamp 5 forming part of the base 6. The clamp 5 may be tightened by the screw 7 to firmly retain the lens tube. A sound aperture plate 8 is mounted on an angular extension of the base 6. The plate 8 contains an aperture 9 through which the image formed by the lens tube 4 fall on the film. The outer surface of the plate 8 is machined to be accurately normal to the bearing surface of the base 6. When the lens tube is in use in the sound reproducing unit of the sound picture projector the film carrying the sound record is yieldingly retained in contact with the outer surface of the plate 8. The inner surface of the clamp 5 is machined to bring the optical axis of the lens tube 4 accurately parallel to the bearing surface of the base 6 and accurately normal to the outer surface of the aperture plate 8.

Referring now to Fig. 1, the base 10 supports an angle plate 11 having its interior surfaces machined to be accurately at right angles. Attached to the base 10 is a housing 45 supporting two vertically disposed spring plungers 13. A similar housing 46 supports a horizontally disposed spring plunger 47 which may be retracted by means of the finger lever 14. A boss 12 forming part of the base 10 supports a set screw 40. The lower surface of the set screw 40 forms a limiting stop. When the lens tube is inserted in the adjusting device, the upper edge of the lens tube base 6 is pressed against the set screw 40 by the spring plungers 13.

Referring particularly to Figs. 4 and 5 in which, for clearness, the lens tube is removed from the clamp 5, the plunger 47 presses against the rear end of the base 6 and forces the sound aperture plate 8 firmly against the surface of the angle plate 11. The housing 46 is mounted on a clamping member 48. One end of the clamping member 48 bears on a stop member 49 mounted on the base 10 while the other end is formed into two projections 50 and 51 bearing on the surface of the base 6. A screw 52 passes through a hole drilled in the base 10 and engages a nut 53. By tightening the nut 53 the clamping member 48 is drawn towards the base 10 and the projections 50 and 51 force the base 6 firmly against the surface of the plate 11. A clamping ring 15 having a knurled portion and a projecting portion may be secured to the lens tube 4 by a set screw 16. A yoke 17 engages the projecting portion of ring 15 and is attached to the rod 18 sliding in the bearing 19 supported by the boss 12. The rod 18 terminates in a reduced portion having a micrometer thread engaging the nut 20. The nut 20 has a bearing in the journal 21 formed on the base 10 and is rotatably retained by the nut 22. Rotating the nut 20 will cause the rod 18 to be screwed through the nut 20 slowly moving the yoke 17 causing the lens tube 4 to slide in the clamp 5. When in use in the projector the film is pressed against the outer surface of the aperture plate 8. In this fixture the same surface of the aperture plate is pressed against the inner surface of angle plate 11. The inner surface of the angle plate thus simulates the surface of the film.

A suitable lamp 23 is mounted on a clamp 24, retained on a supporting pin (not shown) by the nut 27. Current may be supplied to the lamp through the contact pin 28, slidable contact 41 and flexible lead 29 and the supporting pin (not shown) on which the clamp 24 is mounted. A screw 25 threaded in the clamp 24 bears against the end of the supporting pin. By rotating the screw 25 the clamp 24 carrying the lamp 23 is traversed along the supporting pin. The lamp 23 is supported by a shelf 44 retained by the screws 42 and 43 which pass through slotted openings in the shelf 44. By loosening the screws 42 and 43 the lamp 23 may be moved forward and backward along the optical axis of the lens tube. The lamp socket is retained by the set screw 26 threaded in the shelf 44, so that by loosening the set screw 26 the lamp 23 may be adjusted vertically. The lamp is thus adjusted until the image of the filament evenly illuminates the slit. Though a specific form of lamp is illustrated, any form of illumination which will produce an even illumination of the slit may be used.

Mounted on a projecting shelf 30 formed on the base 10 is a microscope 31 focussed on the inner surface of the projecting portion of the angle plate 11. A suitable aperture is pierced through the angle plate 11 on the optical axis of the lens tube 4. The microscope 31 is secured in the clamp 32 by the screw 33 so that the optical axis of the microscope 31 is normal to the inner surface of the angle plate 11 and parallel to the optical axis of the lens tube 4. The clamp 32 is slidably retained in a V groove 34.

As shown in Fig. 3, a threaded hole is drilled and tapped in one end of the clamp 32. A screw 35 engages the threads tapped in clamp 32 and is supported in a bearing 37 secured to the shelf 30 by the screw 38. A washer 39 and handle 36 pinned to the screw 35 on opposite sides of the bearing 37 rotatably retain the screw 35. Rotating the handle 36 will cause the clamp 32 to slide in the V groove, traversing the microscope 31 in a direction at right angles to the optical axis of the lens tube 4.

The method of adjusting a lens tube using this fixture will now be described. The clamp 5 is released from the lens tube 4 by slackening the screw 7. The clamping ring 15 is placed over the end of the lens tube 4. By means of the finger lever 14, the horizontal plunger 47 is retracted far enough to permit the aperture base 6 to be forced into place behind the clamp 48 depressing the plungers 13. The finger lever 14 is then released, permitting the spring plunger 47 to force the aperture plate 8 against the inner surface of the angle plate 11 and the nut 53 is tightened. While the base 6 is being inserted, the clamping ring 15 is slipped into the yoke 17 and the set screw 16 tightened.

The lamp 23 is lighted and adjusted till the image viewed through the microscope 31 appears to be evenly illuminated. The thumb nut 20 is rotated causing the yoke 17 to slide the lens tube 4 in the clamp 5 until the image of the slit formed in the plane of the inner surface of the angle plate 11 is of the desired size. The size of the image may be measured by magnifying the image by the microscope 31 and projecting the magnified image to fall on a ruled screen, or by means of cross hairs suitably spaced mounted in the microscope. After the lens tube 4 has been adjusted in the clamp 5 to produce the desired size of image, the microscope 31 is traversed by the handle 36 to determine if the longer edge of the image is parallel to the direction of traverse of the microscope. If the longer edge of the image is not parallel to the direction of traverse of the microscope, the lens tube 4 is rotated in the clamp 5 by means of the knurled head on the clamping ring 15 until parallelism is attained. The size of the image is then measured at several points to determine if the optical system is properly ground to give a truly rectangular image. The clamp 5 is then tightened by the screw 7 and the adjustment checked. When the location of the lens tube 4 in the clamp 5 with the screw 7 tight is satisfactory, the device is ready to be inserted in the sound picture projector. The sound picture projector is provided with an accurately machined surface against which the base 6 is secured in the correct location for sound reproduction.

What is claimed is:

1. In combination a source of light, a support having a main portion and an apertured extension, said extension forming a surface simulating the surface of a film sound record, an optical system mounted on said support and illuminated by said light to form an image in said aperture, and appliance for adjusting said optical system comprising a member having mutually normal flat surfaces formed so as not to obstruct said image, means for retaining said support in contact with said mutually normal surfaces mounted on said member, and manually operable means mounted on said member and engaging said optical system to vary said image.

2. In combination, a source of light, a support having a main portion and an apertured extension, said extension forming a surface simulating the surface of a film sound record, an optical system mounted on said support and illuminated by said light, and an appliance for bringing the focal point of said optical system in the plane of said surface comprising a member having mutually normal flat surfaces formed so as not to obstruct the axis of said optical system, means mounted on said member for retaining said support in contact with said mutually normal surfaces, and manually operable means mounted on said member and engaging said optical system for moving a portion of said optical system normal to said plane of said surface.

3. In combination, a source of light, a support having a main portion and an apertured extension, said extension forming a surface simulating the surface of a film sound record, a clamp on the main portion of said support, a lens tube supported in said clamp and illuminated by said light to form an optical image in said aperture, and an appliance for locating said lens tube in said clamp comprising a base member, an angle plate having mutually normal flat surfaces mounted on said member, one of said surfaces being normal to the optical axis of said lens tube and having an aperture on said axis, means mounted on said base member for holding said support in contact with said mutually normal surfaces, manually operable means mounted on said base member and engaging said lens tube for moving said lens tube in said clamp.

4. In combination, a support having a main portion and an apertured extension, said extension forming a surface simulating the surface of a film sound record, a source of light, an optical system illuminated by said light and forming an optical image in said aperture, means on the main portion of said support for supporting said optical system, and an appliance for adjusting said optical system comprising a base member, an angle plate having mutually normal flat surfaces mounted on said member, one of said surfaces being normal to the optical axis of said optical system and having an aperture on said axis, clamping means on said base member for holding said support in contact with said mutually normal surfaces, manually operable means mounted on said base member and engaging said optical system for adjusting said optical system, and optical means mounted on said base member and focussed on the image formed in said aperture for determining the adjustment of said optical system by measuring said image.

5. In combination, a source of light, a sound aperture plate having a surface simulating the surface of the film, a lens tube supported by said plate and illuminated by said light to form an image and a device for focussing said image in the plane of said surface comprising a base member, a member having two surfaces mutually normal supported by said base member one of said surfaces having an aperture on the optical axis of said lens tube, elastically actuated members for retaining said aperture plate in contact with both said mutually normal surfaces, a removable ring clamped to said lens tube, manually operable means engaging said ring, optical means focussed on the plane of said surface simulating the film, and manually operable means for traversing said optical means parallel to said surface.

6. In combination, a source of light, a support having a main portion and an apertured extension forming a surface simulating the surface of a film sound record, a lens tube having a slit member secured therein, the optical axis of said lens tube being normal to said surface and passing through said aperture, means for adjusting said lens tube normally with respect to said surface, and means for rotatably adjusting said lens tube in operative relation to said surface.

7. In combination, a support having a main portion and an apertured extension normal to said main portion, said extension forming a surface simulating the surface of a film sound record, a source of light, an optical system comprising a container, an opaque slitted screen in said container, a condensing lens system for illuminating said slit with light from said source, and an objective lens system for forming an image of said slit and an appliance for adjusting said optical system comprising a member having two mutually normal flat surfaces so formed as not to obstruct said image, means mounted on said member for clamping said support in contact with both said mutually normal surfaces, manually operable means mounted on said member and engaging said optical system to vary the distance between said objective lens and said surface simulating a film sound record, and means mounted on said container for rotatably adjusting said optical system.

8. In combination, a source of light, a support having a main portion and an apertured extension normal to said main portion, said extension forming a surface simulating the surface of a film sound record, an optical system, comprising a container, an opaque slitted screen in said container, a condensing lens system for illuminating said slit with light from said source, and an objective lens for forming an image of said slit and an appliance for adjusting said optical system comprising a base member, an angle plate having mutually normal flat surfaces mounted on said base, one of said surfaces being normal to the optical axis of said optical system and having an aperture on said axis, a stop on said base member, elastically actuated means on said base member for retaining said support in contact with said stop, a clamp on said base member for retaining said support in contact with one of said mutually normal surfaces, an elastically actuated plunger mounted on said base member for retaining said support in contact with said apertured surface of said angle plate, a removable ring clamped to said container, a yoke engaging said ring, and a rod journalled in said base member and manually actuated to move said yoke normal to said surface simulating the record.

9. In combination, a source of light, a support having a main portion and an apertured extension normal to said main portion, said extension forming a surface simulating the surface of a film sound record, an optical system, comprising a container, an opaque slitted screen in said container, a condensing lens system for illuminating said slit with light from said source and an objective lens system for forming an image of said slit in said aperture and an appliance for adjusting said optical system comprising a base member, an angle plate having mutually normal flat surfaces mounted on said base, one of said surfaces being normal to the optical axis of said optical system and having an aperture on said axis, a stop on said base member, elastically actuated means on said base member for retaining said support in contact with said stop, a clamp on said base member for retaining said support in contact with one of said mutually normal surfaces, an elastically actuated plunger mounted on said base member for retaining said support in contact with the apertured surface of said angle plate, a ring clamped to said container, a yoke engaging said ring, a rod journalled in said base member and manually actuated to move said yoke normal to said surface simulating the record, a V groove in said base member parallel to said surface simulating the record, a carriage in said groove, manually actuated means for traversing said carriage in said groove, and a microscope mounted on said carriage and focused on the image formed in said aperture.

In witness whereof, I hereunto subscribe my name this 23 day of August, 1929.

ROY V. TERRY.